United States Patent
Nagasuna et al.

(10) Patent No.: US 6,797,735 B2
(45) Date of Patent: Sep. 28, 2004

(54) PROCESS FOR PRODUCING POROUS POLYMER

(75) Inventors: Kinya Nagasuna, Nara (JP); Kenji Kadonaga, Takatsuki (JP); Hirotama Fujimaru, Himeji (JP); Kozo Nogi, Kakogawa (JP); Kenji Minami, Otsu (JP)

(73) Assignee: Nippon Shokubai Co., Ltd., Osaka (JP)

( * ) Notice: Subject to any disclaimer, the term of this patent is extended or adjusted under 35 U.S.C. 154(b) by 93 days.

(21) Appl. No.: 10/332,219

(22) PCT Filed: Jun. 28, 2001

(86) PCT No.: PCT/JP01/05557

§ 371 (c)(1),
(2), (4) Date: Jan. 3, 2003

(87) PCT Pub. No.: WO02/02648

PCT Pub. Date: Jan. 10, 2002

(65) Prior Publication Data

US 2004/0002555 A1 Jan. 1, 2004

(30) Foreign Application Priority Data

Jul. 5, 2000 (JP) .................................... 2000-203744

(51) Int. Cl.⁷ ................................................. C08J 9/28

(52) U.S. Cl. ............................................ 521/64; 521/65
(58) Field of Search ..................................... 521/64, 65

(56) References Cited

U.S. PATENT DOCUMENTS

| | | | | |
|---|---|---|---|---|
| 5,189,070 A | * | 2/1993 | Brownscombe et al. | ...... 521/64 |
| 5,795,921 A | * | 8/1998 | Dyer et al. | ............. 521/146 |
| 5,863,958 A | * | 1/1999 | Dyer et al. | ............... 521/63 |

* cited by examiner

*Primary Examiner*—Morton Foelak
(74) *Attorney, Agent, or Firm*—Fish & Richardson P.C.

(57) ABSTRACT

A method of production is provided which is capable of efficiently producing in a very short period of time a porous polymer possessing a uniform foam structure and truly excelling in absorption properties and physical properties. It is a method for the production of a porous polymer, characterized by comprising (a) an emulsifying step for forming a water-in-oil type high internal phase emulsion (HIPE) by mixing and stirring an oil phase containing a polymerizing monomer component and a surfactant as essential components, (b) a shaping step for shaping the HIPE in a specific form, and (c) a polymerizing step for polymerizing the shaped HIPE and controlling the temperatures of the emulsion at the component steps (a)–(c) so that they may not produce a change exceeding 10° C. or controlling all the component steps so that they may proceed at temperatures of not lower than 80° C.

7 Claims, No Drawings

PROCESS FOR PRODUCING POROUS POLYMER

TECHNICAL FIELD

This invention, in the production of a porous polymer having open cells form open pores extending from the surface through the interior thereof by polymerizing a water-in-oil type high internal phase emulsion (hereinafter occasionally abbreviated as "HIPE"), relates to a method for producing the porous polymer by curing the HIPE in a very short period of time. More particularly, this invention relates to a method for the production of a porous polymer having open cells and proving to be useful in a wide range of applications including (1) liquid absorbing materials such as, for example, (a) absorbing materials for such humoral fluids as urine and blood, typified by cores in disposable diapers and (b) absorbing materials for water, oil, and organic solvents, typified by agents for disposing of waste water, waste oil, and waste solvent, (2) energy absorbing materials such as, for example, absorbing materials for sound and heat, typified by sound insulators and heat insulators, and (3) bases for impregnation with pharmaceutical preparations such as, for example, household articles impregnated with aromatic agents, cleaning agents, lustering agents, surface protecting agents, and flame retardants.

BACKGROUND ART

The term HIPE refers to an emulsion having a water phase which is a disperse phase (inner phase) and an oil phase which is an outer phase at a ratio (W/O ratio) of not less than about 3/1. It has been known to produce a porous polymer by polymerizing this HIPE. While a porous polymer which is produced by using a foaming agent without involving conversion into an HIPE (hereinafter occasionally referred to briefly as "foam") is liable to afford a foam made up of discrete cells of a relatively large pore diameter, the method for producing a porous polymer from the HIPE (hereinafter occasionally referred to briefly as "HIPE method") is an excellent process for the production of a foam of low density made up of open cells of a minute pore diameter.

Methods proposed with the object of producing porous polymers from an HIPE have been disclosed in JP-A-57-98713, JP-A-62-50002, U.S. Pat. No. 5,252,619, and U.S. Pat. No. 5,189,070, for example.

JP-A-57-98713 and JP-62-50002 disclose a method which comprises preparing an HIPE containing a water-soluble and/or an oil-soluble polymerization initiator and thermally polymerizing this HIPE at 50° C. or 60° C. for a period of from 8 hours through 72 hours. U.S. Pat. No. 5,210,104 discloses a method which comprises preparing an HIPE and subsequently adding a polymerization initiator thereto, U.S. Pat. No. 5,252,619 discloses a method which comprises preparing an HIPE containing a polymerization initiator and then polymerizing the HIPE at a temperature of not lower than 90° C., and U.S. Pat. No. 5,189,070 discloses a method which comprises forming a gel possessing a prescribed dynamic shear modulus from an emulsion at a temperature of 20° —less than 65° C. and then polymerizing this gel at a temperature of not lower than 70° C.

The methods which are disclosed in JP-A-57-98713 and JP-62-50002, however, require unduly long times for polymerization and suffer from unsatisfactory efficiency of production. While the methods of U.S. Pat. No. 5,252,619 and U.S. Pat. No. 5,189,070 are capable of completing polymerization in comparatively short periods of time when the temperatures used are high, they still require unduly long times approximating several hours for polymerization and, depending on conditions, impair the stability of a relevant HIPE, tend to entail liberation of a large quantity of water, and eventually fail to obtain a porous polymer of a prescribed pore diameter. The method of U.S. Pat. No. 5,210,104 is described to require several hours as the time for polymerization, though it is capable of improving the stability of the emulsification of an HIPE owing to the addition of a polymerization initiator subsequently to the preparation of the HIPE.

We have taken notice of the time required for the polymerization of an HIPE, pursued a study in search of a method for producing a porous polymer by polymerizing (curing) an HIPE in a very short period of time, perfected a procedure for fulfilling this method, and filed the invention covering this method for patent (Japanese Patent Application No. 290141/1999). Though this procedure has been confirmed to improve markedly the factor of the time for polymerization and enhance the productivity, it has betrayed the possibility of varying the particle diameter of an emulsion and the distribution thereof depending on the kind of emulsion and the conditions of polymerization during the change of the temperature of the emulsion particularly at a specific rate of temperature increase and consequently inducing fine variation in the particle diameter of the produced foam and preventing the form from manifesting expected foam properties.

The object of this invention, therefore, comprises solving such a technical problem as implied above and providing a method for the production of a porous polymer which can produce the porous polymer with further exalted foam properties such as, for example, the absorption properties of foam in a very short period of time such as, for example, not more than 30 minutes and preferably not more than 20 minutes.

DISCLOSURE OF THE INVENTION

We, as a result of performing a diligent study with a view to developing a method for producing a porous polymer from an HIPE in a very short period of time, have discovered that a porous polymer excelling in foam properties can be produced preferably continuously in a very short period of time such as, for example, not more than 30 minutes and preferably not more than 10 minutes in the method for the production of a porous polymer which comprises (a) an emulsifying step for producing an HIPE, (b) a shaping step for imparting a prescribed shape to the HIPE, and (c) a polymerizing step for polymerizing the formed HIPE, by heeding changes of temperature of the HIPE during the component steps (a)–(c) of the process mentioned above and controlling the temperature of the emulsion so as not to produce a change exceeding 10° C. in the intervals between the component steps of the process or in the method for the production of a porous polymer which comprises (a) an emulsifying step for preparing an HIPE, (b) a shaping step for imparting a shape to the HIPE, and (c) a polymerizing step for polymerizing this HIPE, by controlling the temperatures in the component steps of the process mentioned above so as to remain in respectively specified ranges. This invention has been consequently perfected.

The object mentioned above is accomplished by the following items (1)–(7).

(1) A method for the production of a porous polymer by the polymerization of a water-in-oil type high internal phase emulsion obtained from an oil phase containing a polymerizing monomer component and a surfactant and a water phase containing water, which method is characterized by comprising (a) an emulsifying step for forming a water-in-oil type high internal phase emulsion, (b) a shaping step for shaping the emulsion in the form of a sheet or a film, and (c) a polymerizing step for polymerizing the emulsion and having the temperatures during the component steps mentioned above so controlled as to produce no change exceeding 10° C.

(2) A method for the production of a porous polymer by the polymerization of a water-in-oil type high internal phase emulsion obtained from an oil phase containing a polymerizing monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in the form of a sheet or a film, and (c) a continuous polymerizing step for continuously polymerizing the emulsion and having the temperatures during the component steps mentioned above so controlled as to produce no change exceeding 10° C.

(3) A method for the production of a porous polymer by the polymerization of a water-in-oil type high internal phase emulsion obtained from an oil phase containing a polymerizing monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in a thickness of not more than 50 mm, and (c) a continuous polymerizing step for continuously polymerizing the emulsion and having the temperatures during the component steps mentioned above so controlled as to produce no change exceeding 10° C.

(4) A method for the production of a porous polymer by the polymerization of a water-in-oil type high internal phase emulsion obtained from an oil phase containing a polymerizing monomer component and a surfactant and a water phase containing water, which method is characterized by comprising (a) an emulsifying step for forming a water-in-oil type high internal phase emulsion, (b) a shaping step for shaping the emulsion in the form of a sheet or a film, and (c) a polymerizing step for polymerizing the emulsion and having the component steps of the process mentioned above to proceed invariably at a temperature of not lower than 80° C. and not higher than 110° C.

(5) A method for the production of a porous polymer by the polymerization of a water-in-oil type high internal phase emulsion obtained from an oil phase containing a polymerizing monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in the form of a sheet or a film, and (c) a continuous polymerizing step for continuously polymerizing the emulsion and having the component steps of the process mentioned above to proceed invariably at a temperature of not lower than 80° C. and not higher than 110° C.

(6) A method for the production of a porous polymer by the polymerization of a water-in-oil type high internal phase emulsion obtained from an oil phase containing a polymerizing monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in a thickness of not more than 50 mm, and (c) a continuous polymerizing step for continuously polymerizing the emulsion and having the component steps of the process mentioned above to proceed invariably at a temperature of not lower than 80° C. and not higher than 110° C.

(7) A method for the production of a porous polymer by the polymerization of a water-in-oil type high internal phase emulsion obtained from an oil phase containing a polymerizing monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in a necessary shape, and (c) a continuous polymerizing step for continuously polymerizing the emulsion and having the component steps of the process mentioned above to proceed invariably at a temperature of not lower than 80° C. and having a polymerization initiator incorporated in the emulsion after the start of (a) the continous emulsifying step and before the completion of (b) the continuous shaping step.

BEST MODE FOR CARRYING OUT THE INVENTION

[I] For a start, the steps of process in the first, second, and third methods of production according to this invention will be described in detail below in the order of their occurrence.

The first aspect of this invention is directed toward a method for the production of a porous polymer by the polymerization of a water-in-oil type high internal phase emulsion obtained from an oil phase containing a polymerizing monomer component and a surfactant and a water phase containing water, which method is characterized by comprising (a) an emulsifying step for forming a water-in-oil type high internal phase emulsion, (b) a shaping step for shaping the emulsion in the form of a sheet or a film, and (c) a polymerizing step for polymerizing the emulsion and having the temperatures during the component steps mentioned above so controlled as to produce no change exceeding 10° C.

The second aspect of this invention is directed toward a method for the production of a porous polymer by the polymerization of a water-in-oil type high internal phase emulsion obtained from an oil phase containing a polymerizing monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in the form of a sheet or a film, and (c) a continuous polymerizing step for continuously polymerizing the emulsion and having the temperatures during the component steps mentioned above so controlled as to produce no change exceeding 10° C.

The third aspect of this invention is directed toward a method for the production of a porous polymer by the polymerization of a water-in-oil type high internal phase emulsion obtained from an oil phase containing a polymerizing monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in a thickness of not more than 50 mm, and (c) a continuous polymerizing step for continuously polymerizing the emulsion and having the temperatures during the component steps mentioned above so controlled as to produce no change exceeding 10° C.

(a) Emulsifying Step to form Water-In-Oil Type High Internal Phase Emulsion (HIPE)

1. Raw Materials to be Used for HIPE

The raw materials to be used for the HIPE are an oil phase containing (1) a polymerizable monomer component and (2) a surfactant and a water phase containing (3) water. As typical examples of the polymerizable monomer component, (1-1) polymerizing monomers which have one polymerizable unsaturated group in the molecular unit thereof and (1-2) cross-linkable monomers which have at least two polymerizable unsaturated groups in the molecular unit thereof may be cited. The raw materials, when necessary, may further include (4) a polymerization initiator, (5) a salt, and (6) other additive as arbitrary components for the oil phase and/or the water phase.

(1) Polymerizable Monomer Component

The polymerizable monomer component is capable of forming a cross-linked structure by polymerization and generally comprises (1-1) a polymerizing monomer having one polymerizable unsaturated group in the molecular unit thereof and/or (1-2) a cross-linkable monomer having at least two polymerizable unsaturated groups in the molecular unit thereof. They do not need to be particularly restricted but are only required to be capable of being dispersed or polymerized in a water-in-oil type high internal phase emulsion so as to give rise to a foam.

The polymerizable monomer (1-1) preferably contains a (meth)acrylic ester at least partly, more preferably contains not less than 20 mass % of a (meth)acrylic ester, and particularly preferably contains not less than 35 mass % of a(meth)acrylic acid. The fact that the polymerizable monomer (1-1) contains a (meth)acrylic ester is at an advantage in enabling production of a porous polymer which abounds in softness and toughness.

As typical examples of the polymerizable monomer (1-1), arylene monomers such as styrene; monoalkylene arylene monomers such as styrene, ethyl styrene, alpha methyl styrene, vinyl toluene, and vinyl ethyl benzene; (meth) acrylic esters such as methyl (meth)acrylate, ethyl (meth) acrylate, butyl (meth)acrylate, isobutyl (meth)acrylate, isodecyl (meth)acrylate, 2-ethylhexyl(meth)acrylate, lauryl (meth)acrylate, stearyl (meth)acrylate, cyclohexyl (meth) acrylate, and benzyl (meth)acrylate; chlorine-containing monomers such as vinyl chloride, vinylidene chloride, and chloromethyl styrene; acrylonitrile compounds such as acrylonitrile and methacrylonitrile; and other compounds such as vinyl acetate, vinyl propionate, N-octadecyl acrylamide, ethylene, propylene, and butene may be cited. Besides being used singly, these polymerizing monomers may be used in the form of a combination of two or more members.

The quantity of the polymerizable monomer (1-1) to be used generally is preferred to be in the range of 10–99.9 mass %, based on the weight of the whole polymerizable monomer which comprises the polymerizable monomer (1-1) mentioned above and the cross-linkable monomer (1-2) which will be specifically described herein below. When the quantity is in this range, the produced porous polymer acquires a fine pore diameter. The quantity is preferably in the range of 30–99 mass % and particularly preferably in the range of 50–95 mass %. If the quantity of the polymerizable monomer (1-1) to be used falls short of 10 mass %, the shortage will possibly render the produced porous polymer unduly brittle or deficient in the ratio of water absorption. Conversely, if the quantity of the polymerizable monomer (1-1) to be used exceeds 99.9 mass %, the excess will possibly render the produced porous polymer deficient in strength and power of elastic recovery and incapable of absorbing water in a fully satisfactory amount at a satisfactory speed.

The cross-linking monomer (1-2) mentioned above has only to contain at least two polymerizable unsaturated groups in the molecular unit thereof and permit formation of a cross-linked structure by polymerization. Similarly to the polymerizable monomer (1-1) mentioned above, it does not need to be particularly restricted but is only required to be dispersible or polymerizable in a water-in-oil type high internal phase emulsion so as to give rise to a foam.

As typical examples of the cross-linkable monomer (1-2), aromatic monomers such as divinyl benzene, trivinyl benzene, divinyl toluene, divinyl xylene, p-ethyl-vinyl benzene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as divinyl furan; sulfur-containing monomers such as divinyl sulfide and divinyl sulfone; aliphatic monomers such as butadiene, isoprene, and pentadiene; and esters of polyhydric alcohols with methacrylic acid or methacrylic acid such as ethylene glycol di(meth)acrylate, diethylene glycol di(meth)acrylate, triethylene glycol di(meth)acrylate, polyethylene glycol di(meth)acrylate, 1,3-butane diol di(meth) acrylate, 1,4-butane diol di(meth)acrylate, 1,6-hexane diol di(meth)acrylate, octane diol di(meth)acrylate, decane diol di(meth)acrylate, trimethylol propane di(meth)acrylate, trimethylol propane tri(meth)acrylate, pentaerythritol di(meth) acrylate, penta-erythritol tri(meth)acrylate, pentaerythritol tetra(meth)acrylate, dipentaerythritol di(meth)acrylate, dipentaerythriol tri(meth)acrylate, dipentaerythritol tetra (meth)acrylate, N,N'-methylene bis(meth)-acrylamide, triallyl isocyanurate, triallyl amine, tetralloloxy ethane, hydroquinone, catechol, resorcinol, and sorbitol may be cited. These cross-linkable monomers may be used in the form of a combination of two or more members besides being used singly.

The quantity of the cross-linkable monomer (1-2) mentioned above is preferably in the range of 0.1–90 mass %, more preferably in the range of 1–70 mass %, and particularly preferably in the range of 5–50 mass %, based on the weight of the whole polymerizable monomer component which comprises the polymerizable monomer (1-1) and the cross-linkable monomer (1-2). If the quantity of the cross-linkable monomer (1-2) to be used falls short of 0.1 mass %, the shortage will possibly render the produced porous polymer unduly deficient in strength and power of elastic recovery, insufficient in capacity for absorption per unit volume or unit weight, and incapable of absorbing water in a fully satisfactory amount at a satisfactory speed. Conversely, if the quantity of the cross-linkable monomer (1-2) to be used exceeds 90 mass %, the excess will possible render the porous polymer unduly brittle or insufficient in the ratio of cubital expansion due to absorption of water.

(2) Surfactant

The surfactant mentioned above does not need to be particularly restricted but is only required to be capable of emulsifying the water phase in the oil phase forming the HIPE. It may be selected from among nonionic surfactants, cationic surfactants, anionic surfactants, and amphoteric surfactants which have been heretofore known to the art.

As typical examples of the nonionic surfactant, nonylphenol polyethylene oxide adduct; block polymer of ethylene oxide with propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitane sesquioleate, and sorbitan distearate; glycerin fatty acid esters such as glycerol monostearate, glycerol monooleate, diglycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polypoxyethylene alkylaryl ethers such as polyoxyethylene nonylphenyl ether; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as tetraoleic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines; polyoxyethylene-cured castor oil; and alkyl alkanol amides may be cited. Particularly, the HLB values of these nonionic surfactants are not more than 10 and preferably 2–6. These nonionic surfactants may be used in the form of a combination of two or more members. This combined use possibly results in improving the HIPE in stability.

As typical examples of the cationic surfactant, quaternary ammonium salts such as stearyl trimethyl ammonium chloride, ditallow dimethyl ammonium methyl sulfate, cetyl trimethyl ammonium chloride, distearyl dimethyl ammonium chloride, and alkyl benzyl dimethyl ammonium chloride; alkyl amine salts such as coconut amine acetate and stearyl amine acetate; alkyl betaines lauryl trimethyl ammonium chloride, lauryl betaqine, stearyl betaine, and lauryl carboxymethyl hydroxyethyl imidazolinium betaine; and amine oxides such as lauryl dimethyl amine oxide may be cited. By adding such a cationic surfactant, it may be made possible to impart to the produced porous polymer an excellent antibacterial property when the porous polymer is used in water-absorbing materials.

Incidentally, the combined use of a nonionic surfactant and a cationic surfactant possibly results in imparting improved stability to the HIPE.

The quantity of the surfactant mentioned above to be used is preferably in the range of 1–30 mass parts and more preferably in the range of 3–15 mass parts, based on 100 mass parts of the whole polymerizable monomer component which comprises a polymerizable monomer (1-1) and a cross-linkable monomer (1-2). If the quantity of the surfactant to be used falls short of 1 mass part, the shortage will possible result in destabilizing the HIPE in dispersibility and preventing the surfactant from fully satisfactorily manifesting the action and effect inherent therein. Conversely, if the quantity of the surfactant to be used exceeds 30 mass parts, the excess will be at a disadvantage economically in possibly rendering the produced porous polymer unduly brittle and failing to bring about a proportionate addition to the effect to be manifested.

(3) Water

As the water mentioned above, the waste water which occurs in the production of the porous polymer may be used either directly or after undergoing a prescribed treatment, besides the tap water, purified water, and deionized water.

The quantity of the water mentioned above to be used can be suitably selected, depending on the purpose for which the porous polymer having an open cell is to be used (such as, for example, a water-absorbing material, an oil-absorbing material, a sound insulator, or a filter). Since the hole ratio of a porous polymer is decided by varying the water phase/oil phase (W/O) ratio of a given HIPE, the quantity of the water to be used is automatically decided by selecting such a W/O ratio as conforms to the hole ratio which fits the purpose of use mentioned above.

(4) Polymerization Initiator

For the purpose of accomplishing the polymerization of an HIPE in a very short period of time as aimed at by this invention, it is preferable to use a polymerization initiator. This polymerization initiator is only required to be usable in ordinary polymerization. It may be soluble in water or in oil, whichever fits the occasion better.

As concrete examples of the water-soluble polymerization initiator, azo compounds such as 2,2'-azobis-(2-amidinopropane) dihydrochloride; persulfates such as ammonium persulfate, potassium persulfate, and sodium persulfate; and peroxides such as potassium peracetate, sodium peracetate, potassium percarbonate, and sodium percarbonate may be cited.

As typical examples of the oil-soluble polymerization initiator, hydroperoxides such as cumene hydroperoxide, t-butyl hydroperoxide, diisopropyl benzene hydroperoxide, p-menthane hydroperoxide, and 1,1,3,3-tetramethyl butyl hydroperoxide; dialkyl peroxides such as di-t-butyl peroxide, 2,5-dimethyl-2,5-di(t-butyl peroxy) hexane, tbutyl cumyl peroxide, and dicumyl peroxide; peroxy carbonates such as di-isopropyl peroxy dicarbonate, dicyclohexyl peroxy dicarbonate, di(s-butyl) peroxy dicarbonate, and di(2-ethylhexyl) peroxy dicarbonate; diacyl peroxides such as acetyl peroxide, propionyl peroxide, decanoyl peroxide, isobutylyl peroxide, octanoyl peroxide, lauroyl peroxide, stearolyl peroxide, and benzoyl peroxide; peroxy ketals such as 1,1'-di-(t-butyl peroxy) cyclohexane and 1,1'-di-(t-butyl peroxy)-3,3,5-trimethyl cyclohexane; ketone peroxides such as cyclohexanone peroxide, methyl cyclohexanon peroxide, methylethyl ketone peroxide, and acetyl acetone peroxide; and peroxy esters such as cumyl peroxy neodecanoate, 1,1,3,3-tetramethylbutyl peroxy neodecanoate, 1-cyclohexyl-1-1-methylethyl peroxy neodecanoate, t-hexylperoxy neodecanoate, t-butyl peroxy neodecanoaate, t-butyl peroxy isobutyrate, t-butyl peroxy pivalate, 1,1,2,2-tetramethylbutyl peroxy-2-ethyl hexanoate, 2,5-dimethyl-2, 5-di(2-ethylhexanoyl peroxy) hexane, 1-cyclohexyl-1-1-methylethyl peroxy-2-hexanoate, t-amyl peroxy2-ethyl hexanoate, and t-butyl peroxy 2-ethyl hexanoate may be cited.

These polymerization initiators may be used either singly or in the form of a combination of two or more members. As a matter of course, it is permissible to use a water-soluble polymerization initiator and an oil-soluble polymerization initiator in combination.

The quantity of a polymerization initiator which can be used in the reversed-phase emulsion polymerization is preferably in the range of 0.05–25 mass parts and more preferably in the range of 1.0–10 mass parts, based on 100 mass parts of the whole polymerizable monomer component comprising a polymerizable monomer (1-1) and a cross-linkable monomer (1-2), though depending on the combination of the polymerizable monomer component and a polymerization initiator. If the quantity of the polymerization initiator to be used falls short of 0.05 mass part, the shortage will be at a disadvantage in increasing the amount of an unaltered polymerizing monomer component and consequently adding to the amount of a residual monomer in the produced porous polymer. Conversely, if the quantity of the polymerization initiator to be used exceeds 25 mass parts, the excess will be at a disadvantage in rendering the control of polymerization difficult and degrading the mechanical property of the produced porous polymer.

It is further permissible to use a redox polymerization initiator system which is formed by the combination of the polymerization initiator mentioned above with a reducing agent. The polymerization initiator in this system may be soluble in water or in oil, which ever suits the occasion better. It is permissible to use a water-soluble redox polymerization initiator system and an oil-soluble redox polymerization initiator system in combination. As typical examples of the water-soluble reducing agent, sodium hydrogen sulfite, potassium hydrogen sulfite, sodium thiosulfate, potassium thiosulfate, L-ascorbic acid, erysorbic acid, ferrous salts, formaldehyde sodium sulfoxylate, glucose, dextrose, triethanol amine, and diethanol amine may be cited. As typical examples of the oil-soluble reducing agent, such compounds as dimethyl aniline may be cited. These reducing agents in the redox polymerization initiator may be used either singly or in the form of a combination of two or more members. In the case of the redox polymerization initiator system, the ratio of the reducing agent (by mass) to be contained therein is such that the polymerization initiator (oxidizing agent)/reducing agent ratio is approximately in the range of 1/0.01–1/10 and preferably in the range of 1/0.2–1/5.

The polymerization initiator (inclusive of the redox polymerization initiator system) mentioned above is only required to be present at least during the polymerization of an HIPE. As regards the method of adding this polymerization initiator which will be described more specifically herein below, ① the addition may be made to the oil phase and/or the water phase in advance of the formation of an HIPE, ② the addition may be made at the same time as an HIPE is formed, or ③ the addition may be made after the formation of an HIPE. Then, in the case of the redox polymerization initiator system, it is permissible to add the polymerization initiator (oxidizing agent) and a reducing agent at separate times.

(5) Salt

The salt mentioned above may be used when it is required for the purpose of imparting improved stability to the HIPE.

As typical examples of the salt, such water-soluble salts as halides, sulfates, and nitrates of alkali metals and alkaline earth metals like calcium chloride, sodium sulfate, sodium chloride, and magnesium sulfate may be cited. These salts may be used either singly or in the form of a combination of two or more members. Such a salt is preferred to be added to the water phase. Among other metal salts, a polyvalent metal salt proves particularly preferable from the viewpoint of the stability of the relevant HIPE during the course of polymerization.

The quantity of the salt to be used is preferably in the range of 0.1–20 mass parts and more preferably in the range of 0.5–10 mass parts, based on 100 mass parts of water. If the quantity of the salt to be used exceeds 20 mass parts, the excess will be at a disadvantage economically in inducing inclusion of a large amount of a salt in the waste water squeezed from the HIPE and failing to bring about a proportionate addition to the effect of addition. Conversely, if the quantity of the salt to be used falls short of 0.1 mass part, the shortage will possibly prevent the function and effect of the addition of salt from being manifested fully satisfactorily.

(6) Other Additive

Varyious other additives may be suitably used when the addition of performances and functions owned thereby contributes to the enhancement of the conditions of production, the characteristic properties of the relevant HIPE, and the performance of the produced porous polymer. A base and/or a buffer agent, for example, may be added for the purpose of adjusting the pH. The quantities of such additives to be used may be suitably selected in the respective ranges in which the additives are allowed to manifest fully satisfactorily the performances and functions commensurate with their purposes of addition and satisfy economy as well. As typical examples of the additive, activated carbon, inorganic powder, organic powder, metal powder, deodorant, antibacterial agent, mildew proofing agent, perfume, and various high polymers, and surfactant may be cited.

2. Formation (Emulsification) of HIPE

The method which can be used in this invention for the formation (emulsification) of an HIPE does not need to be particularly restricted. Any of the heretofore known methods of preparing an HIPE may be suitably utilized. The typical method of preparing an HIPE will be specifically described below.

For a start, the components forming an oil phase which comprises a polymerizable monomer and a surfactant, a polymerization initiator (inclusive of redox polymerization initiator) further incorporated optionally therein, and other additives in respective quantities specified above are stirred at a prescribed temperature to prepare a homogeneous oil phase.

Separately, the components forming a water phase which comprises water, a polymerization initiator (inclusive of redox polymerization inhibitor) further incorporated optionally therein, a salt, and other additives in respective quantities specified above are stirred and heated to a prescribed HIPE temperature to prepare a homogeneous water phase.

Then, the oil phase which is the mixture of the polymerizable monomer component, the surfactant, etc. prepared as described above and the water phase which is the mixture of water, the water-soluble salt, etc. are efficiently mixed and stirred together at the HIPE forming temperature (emulsifying temperature) which will be specifically described below and emulsified under the optimal shearing force to accomplish stable preparation of an HIPE. As the means of stirring and mixing the water phase and the oil phase for the stable preparation of an HIPE, it is preferable to adopt the method which comprises keeping the oil phase stirred and continuously adding the water phase to the stirred oil phase over a period ranging from several seconds through some tens of minutes. Otherwise, the HIPE aimed at may be produced by stirring and mixing part of the water phase component with the oil phase component till an HIPE is formed and then continuing the stirring and mixing while adding the remainder of the water phase component thereto. For the continuous production contemplated by this invention, the method which comprises continuously feeding the water phase and the oil phase further to the HIPE which has been formed by the preceding procedure and continuing the formation of the HIPE under a shearing force is preferably employed.

3. Water Phase/Oil Phase (W/O) Ratio

The water phase/oil phase (W/O) ratio (by mass) of the HIPE obtained as described above does not need to be particularly restricted but may be suitably selected depending on the purpose of use (such as, for example, water absorbing material, oil absorbing material, sound insulator, or filter) to which the porous polymer furnished with an open cell is put. As specified above, this ratio exceeds 3/1 properly and falls preferably in the range of 10/1–250/1 and particularly in the range of 10/0–100/1. If the W/O ratio falls short of 3/1, the shortage will possibly render the produced porous polymer insufficient in the ability to absorb water and energy and deficient in the numerical aperture as well, compelling the porous polymer to acquire an unduly low numerical aperture in the surface, and preventing the porous polymer from acquiring a fully satisfactory fluid passing property. The hole ratio of the porous polymer is decided by selecting the W/O ratio. It is, therefore, preferable to select the W/O ratio so as to conform to the hole ratio which fits the purpose of use of the porous polymer. When the porous polymer is used as a varyious absorbent material such as, for example, a disposable diaper or a sanitary article, it is preferable to fix the W/O ratio at a level in the approximate range of 10/1–100/1. The HIPE which is obtained by stirring and mixing the water phase and the oil phase is generally a white emulsion of high viscosity. Optionally, it may have the state thereof altered by the composition which varies with the characteristic property of the foam expected to be obtained.

4. Apparatus for Production of HIPE

The apparatus to be employed for the production of the HIPE mentioned above does not need to be particularly restricted but may be selected from among the heretofore known apparatuses available for the production. The stirrer (emulsifier) to be used for the purpose of mixing and stirring the water phase and the oil phase, for example, may be selected from among the known stirring devices and kneading devices. As typical examples of the stirrer, stirring devices with propeller type, paddle type, and turbine type vanes, homomixers, pin mixers, line mixers, and static mixers may be cited. These mixers may be used either singly or in the form of a combination of two or more members so as to impart a necessary pore diameter to the HIPE to be formed.

5. HIPE Forming Temperature $T_0$

The HIPE forming temperature (emulsifying temperature) $T_0$ at the emulsifying step for forming (a) the water-in-oil type high internal phase emulsion generally is in the range of 40°–110° C. If this $T_0$ falls short of 40° C., the shortage will possibly result in elongating the time required for the curing. Conversely if the $T_0$ exceeds 110° C., the excess will possibly result in rendering the formed HIPE deficient in uniformity. Since this invention requires to maintain the temperature $T_0$ of the HIPE so obtained, keep the change of temperature of the emulsion within 10° C., and meanwhile carry out the subsequent (b) shaping step for imparting a necessary shape to the emulsion and (c) polymerizing step for polymerizing the formed emulsion, the HIPE forming temperature $T_0$ is preferred to be as high as permissible from the viewpoint of reducing the time required for the polymerization. It is approximately in the range of 60° C.–105° C. and preferably in the range of 80° C.–100° C., for example. The formation of an HIPE having such a high temperature as exceeds preferably 60° C. and more preferably 80° C. is preferably accomplished by preparatorily adjusting the temperature of the oil phase and/or the water phase at a prescribed HIPE forming temperature (emulsifying temperature) and then proceeding to stir and mix these two phases. Since the HIPE generally contains the water phase in a larger proportion, however, it may well be rated commendable to have at least the temperature of the water phase preparatorily adjusted in the neighborhood of the prescribed HIPE forming temperature $T_0$.

When the polymerizing monomer component in process of emulsification begins to polymerize and forms a polymer, the polymerization possibly destabilizes the HIPE. When the HIPE to be adjusted has preparatorily contained therein a polymerization initiator (inclusive of a redox polymerization initiator system), the HIPE forming temperature $T_0$ ought to pay more consideration to the temperature of the polymerization initiator (oxidizing agent) whose half life is 10 hours (10 hours' half life temperature). When the polymerization initiator is added at the same time as the HIPE is prepared or after the HIPE has been prepared, the method of mixing the HIPE with the polymerization initiator must be selected so as to not only fulfill the 10 hours' half life temperature but also allow the polymerization inhibitor to be uniformly incorporated fully satisfactorily into the HIPE.

6. Method of Adding Polymerization Inhibitor to HIPE

As typical examples of the way of adding the polymerization inhibitor to the HIPE, (a) a method which comprises adding the polymerization initiator to the water phase and/or the oil phase and mixing them in advance of the formation of an HIPE, (b) a method which comprises adding and mixing the polymerization initiator with the two phases at the same time as an HIPE is formed, and (c) a method which comprises adding the polymerization inhibitor after the formation of an HIPE may be cited. Optionally, these methods may be suitably combined. Even when the polymerization initiator happens to be a redox polymerization initiator system or when the polymerization initiator (oxidizing agent) is added in combination with a reducing agent, the methods (a)–(c) mentioned above are available for arbitrary selection.

In the case of the method of (a), though it is convenient to have the polymerization initiator or the reducing agent added preparatorily to the oil phase when it is soluble in water or to the water phase when it is soluble in water, a method of adding the emulsion of an oil-soluble polymerization initiator (oxidizing agent) or a reducing agent to the water phase may be employed, for example. The polymerization initiator can be used in an undiluted state or in the form of a solution or a dispersion in water or an organic solvent.

In this invention, since the change of temperature of the water-in-oil type high internal phase emulsion during each of the steps between the time the water-in-oil type high internal phase emulsion is formed and the time the polymerization is completed is small, the polymerizing monomer component in process of emulsification possibly begins to polymerize and forms a polymer, depending on the kind of polymerization initiator or the method of addition thereof when the temperature of emulsification is set at a high level of not lower than 80° C., for example. For the sake of avoiding this polymerization, it is commendable to add the polymerization initiator by the method of (b) or (c) mentioned above or add either of the reducing agent and the oxidizing agent (polymerization inhibitor) in the redox initiator system by the method of (b) or (c) mentioned above.

When the polymerization inhibitor is added by the method of (b) or (c) as described above at the same time as the HIPE is formed or after the HIPE has been formed, it is important that the added polymerization initiator be uniformly mixed with the HIPE promptly with a view to preventing the polymerizing monomer component from being ununiformly polymerized. In this invention, the HIPE having incorporated therein the polymerization initiator is shaped in the form of a sheet or a film or in a thickness of not more than 50 mm and, at the subsequent polymerizing step, introduced into a polymerization vessel or a continuous polymerizing device. From this point of view, a method of adding the polymerization initiator to the HIPE via an inlet port disposed in the path leading to the site of completion of the shaping step and continuously mixing them with such a line mixer as a static mixer is advantageously used.

The quantity of the polymerization initiator to be used herein is the same as has been described in the paragraph (4) dealing with the polymerization initiator of the preceding section 1.covering the raw materials to be used for the HIPE.

(b) Shaping Step for Imparting a Necessary Shape to Water-In-Oil Type High Internal Phase Emulsion 1. HIPE Shaping Temperature $T_1$ The HIPE which has incorporated therein a polymerization initiator is shaped in a necessary form. The temperature for the shaping of this HIPE is generally in the range of 40°–110° C. This invention requires to control the temperature $T_1$ during the HIPE shaping step so that the temperature of the HIPE during this step may not produce a change exceeding 10° C. relative to the temperature $T_0$ during the emulsifying step (a) for forming an HIPE.

That is, this shaping temperature $T_1$ is controlled in the range of not more than 10° C. from the HIPE forming temperature $T_0$. If the HIPE shaping temperature $T_1$ produces a difference exceeding 10° C. from the HIPE forming temperature $T_0$, the excess will be at a disadvantage in delicately varying the uniformity of the emulsion during the forming step, degrading the properties expected of the finished product, and unduly elongating the time required for the polymerizing step. This change of temperature (difference of temperature) is preferably within 5° C. and more preferably within 2° C.

For the purpose of controlling the HIPE shaping temperature $T_1$ lest the temperature of the HIPE should produce a change exceeding 10° C. relative to the HIPE forming temperature $T_0$, it is necessary that the HIPE conveying line comprising a piping, a line mixer, etc. and extending from the start of the HIPE formation through the shaping step be heated and insulated and the shaping vessel be heated and insulated fully satisfactorily. The time required for imparting a necessary shape is preferred to be so short that it may be preferably within 5 minutes, more preferably within 3 minutes, and most preferably within 1 minute. Even after the shaping step, the process of production is preferred to advance quickly to the polymerizing step for the sake of avoiding the change of temperature during the conveyance to the polymerizing step. The time required in this case is likewise preferred to be so short that it may be preferably within 5 minutes, more preferably within 3 minutes, and most preferably within 1 minute. When the conditions mentioned above are satisfied, the HIPE shaping temperature $T_1$ is preferred to be rather higher than otherwise so as to fall in the approximate range of 60°–105° C. and more advantageously in the range of 80°–100° C.

2. Form in which HIPE is Shaped

In the first and second methods of production contemplated by this invention, the HIPE is shaped in the form of a sheet or a film. The form of a sheet and the form of a film are discriminated by rating the shaped HIPE having a thickness of less than 0.25 mm as a film and the shaped HIPE having a thickness of not less than 0.25 mm as a sheet. This shaping may be carried out continuously or intermittently. When the HIPE is shaped in such a comparatively thin form as a sheet or a film as contemplated by this invention, the temperature of the HIPE largely changes particularly in the course of an ordinary procedure. This explains why this invention requires the conveying line, shaping vessel, and shaping line for the HIPE to be heated and insulated fully satisfactorily so as to control the change of temperature during the course of the shaping within 10° C. relative to the HIPE forming temperature $T_0$.

When the HIPE is shaped in the form of a sheet, the thickness of this sheet is irrelevant. An excess of this thickness over 50 mm, however, demands due attention because it possibly results in inducing deflective separation of the oil phase and the water phase of the HIPE in the vertical direction and impairing the uniformity of composition of the HIPE, depending on the kind of HIPE, preventing the whole HIPE from being uniformly polymerized, depriving the properties of the porous polymer of uniformity, preventing the HIPE in process of shaping from being fully satisfactorily heated and insulated, and aggravating the change of temperature. The thickness is preferably not more than 30 mm, more preferably not more than 15 mm, particularly preferably not more than 10 mm, and most preferably not more than 5 mm. The form of a continuous sheet or film and the form of an intermittent sheet or film which have a thickness in the range specified above can be used advantageously for this invention. The term "thickness" as used herein refers to the distance from one surface to the other surface of a given object and, when an HIPE is externally heated, for example, means the distance (wall thickness) of the HIPE in the perpendicular direction relative to the surface of the HIPE being heated.

In the third method of production according to this invention, an HIPE is shaped in a thickness of not more than 50 mm. If this thickness exceeds 50 mm, the excess will possibly result in inducing deflective separation of the oil phase and the water phase of the HIPE in the vertical direction and impairing the uniformity of composition of the HIPE, depending on the kind of HIPE, preventing the whole HIPE from being uniformly polymerized, and depriving the properties of the porous polymer of uniformity. When the shaping is made in such a comparatively small thickness as mentioned above, however, the temperature of the HIPE is similarly liable to change largely. This invention controls this change of temperature within 10° C. relative to the HIPE forming temperature $T_0$ in the same manner as is described above, specifically by heating and insulating fully satisfactorily the conveying line, shaping vessel, and shaping line for the HIPE. Approximately, the thickness of shaping of the HIPE is preferably not more than 30 mm, more preferably not more than 15 mm, particularly preferably not more than 10 mm, and most preferably not more than 5 mm. The lower limit of the thickness of shaping of the HIPE does not need to be particularly restricted but may be properly decided to suit the purpose of use of the product. Even when the produced porous polymer has a small thickness, by using a plurality of such porous polymers in a superposed state as in a liquid absorbing material, an energy absorbing material, or a chemical impregnating material, for example, it is made possible to secure the performance and quality which are expected of the material. When the porous polymer has a thickness of less than 0.1 mm, it demands payment of due heed because it possibly renders the handling thereof difficult.

(c) Polymerizing Step for Polymerizing Water-In-Oil Type High Internal Phase Emulsion (HIPE)

1. Method of Polymerizing HIPE

Now, the HIPE polymerizing step mentioned above will be described below. The HIPE polymerizing step dies not need to be particularly restricted but may be suitably selected from among the heretofore known methods of polymerizing an HIPE. Generally, the polymerization of an HIPE is effected by heating the HIPE by the stationary polymerization technique under conditions incapable of disrupting the internal structure of the HIPE. In this case, though the batch polymerization which consists in subjecting one batch after another of the HIPE to polymerization and the continuous polymerization which consists in continuously feeding the HIPE into a heating zone and meanwhile casting it are both effectively applicable to the HIPE, the continuous polymerization is preferred over the batch polymerization as a method of polymerization for the sake of putting the effect of short-time polymerization which is a characteristic feature of this invention to advantage and exalting the productivity of the operation. Specifically, a method of continuous polymerization which comprises continuously casting an HIPE in the form of a sheet or a film onto a traveling belt and heating the cast HIPE till polymerization may be cited as a concrete example of the continuous method under discussion. In this case, it is advantageous to use the method of Japanese Patent Application No. 11-314397 which comprises applying a specific oxygen content decreasing means to the outer surface part of an emulsion.

2. HIPE Polymerizing Temperature $T_2$

Though the temperature $T_2$ during the HIPE polymerizing step of this invention generally is in the range of 40–110° C., this invention requires to control this temperature $T_2$ so that the temperature of the HIPE during this step may not produce a change exceeding 10° C. relative to the temperature $T_0$ during the HIPE forming step and the temperature $T_1$ during the HIPE shaping step. That is, this polymerizing temperature $T_2$ is controlled to a level within 10° C. from the HIPE forming temperature $T_0$C. and the HIPE shaping temperature $T_1$.

If the polymerizing temperature $T_2$ has a difference exceeding 10° C. from $T_0$ and $T_1$, the excess will be at a disadvantage in affecting the uniformity of emulsion during the polymerizing step, inducing a discernible sign of partial degradation of the emulsion, giving rise to numerous minute voids in the emulsion, largely degrading the absorption properties of the finished product, and unduly elongating the time required for the polymerizing step. Again in this case, the difference of temperature is within 5° C. and preferably within 2° C.

For the purpose of controlling the HIPE polymerizing temperature $T_2$ so that it may not produce a change exceeding 10° C. relative to the HIPE shaping temperature $T_1$, it is necessary that the HIPE in process of conveyance from the shaping step to the polymerizing zone be insulated and the polymerization vessel be heated and insulated fully satisfactorily. The term "polymerizing step" as used in this invention is defined as extending from the time the shaping of an HIPE is completed through the time the HIPE is deprived of the fluidity at least by polymerization. It, for example, refers to the step which terminates when the rate of polymerization approximately reaches 30%, preferably 50%. Till this termination, the control of the temperature contemplated by this invention must be carried out very attentively.

When the conditions mentioned above are satisfied, the HIPE polymerizing temperature $T_2$ preferably is rather higher than otherwise. It is approximately in the range of 60°–110° C. and preferably in the range of 80°–105° C., for example.

3. HIPE Polymerizing Time

The method of this invention, when the polymerization initiator and the polymerization temperature used therein are optimized, forms a very effective means to effect stable production of a porous polymer of uniform nature and behavior in a very short period of time as in the range of several tens of seconds to 30 minutes. Specifically, in the first, second, and third aspects of this invention, the polymerizing time is preferably within 30 minutes, more preferably within 10 minutes, and particularly preferably in the range of 1–10 minutes. If the polymer curing time exceeds 30 minutes and reaches 60 minutes or 120 minutes, for example, the excess will be possibly at a disadvantage economically and industrially in degrading the productivity of the operation. Of course, this invention does not exclude such conditions as these. Incidentally, if this time falls short of one minute, the shortage will possibly prevent the porous polymer from acquiring fully satisfactory strength.

The term "polymerizing time" as used herein is intended to refer to the total time which elapses since the HIPE enters the polymerizing zone till its departs from the polymerizing zone. The polymerizing temperature $T_2$, however, does not need to be fixed throughout the "polymerizing time" as described above. Particularly while the HIPE is manifesting fluidity during the initial stage of polymerization, namely when this temperature $T_2$ during the "polymerizing step" of this invention remains within the range of temperature contemplated by this invention, the temperature may be changed with the object of promoting the subsequent polymerization within such a range as avoids impairing the quality of the finished product.

Further, this invention is preferred to restrict the polymerizing time mentioned above within 30 minutes and control the quantity of the polymerization initiator to be completely decomposed within the polymerizing time in the range of 0.05–2.0 mol % of the quantity of the polymerizing monomer component. By controlling the quantity within this range, it is made possible to manufacture a porous polymer excelling in the solid state properties of foam in a short period of time within 30 minutes with very high productivity. This quantity in any case denotes that of the polymerization initiator which is completely decomposed within the polymerizing time. So long as this quantity is controlled within the range, the total quantity of the polymerization initiator to be used does not need to be particularly restricted. If the quantity of the polymerization initiator which is completely decomposed within the polymerizing time falls short of 0.05 mol %, the shortage will result in preventing the polymerization from being completed fully satisfactorily within the short period of time within 30 minutes and rendering the porous cross-linked polymer deficient in solid state properties. Conversely, if the quantity of the polymerization initiator to be completely decomposed within the polymerizing time exceeds 2.0 mol %, the excess will possibly render the produced porous cross-linked polymer deficient in such mechanical properties as compressive strength owing to a decrease in molecular weight, for example. This fact calls for much heed. The quantity of the polymerization initiator to be completely decomposed within the polymerizing time of not more than 30 minutes is commendably controlled in the range of 0.10–1.0 mol %, and preferably in the range of 0.15–0.5 mol %. Incidentally, the quantity (mol %) of the polymerization initiator to be completely decomposed within the polymerizing time can be found by the calculation which is described in Japanese Patent Application No. 290141/1999.

4. Polymerizing Apparatus

The polymerizing apparatus which can be used for this invention does not need to be particularly restricted but may be properly selected from among the heretofore known chemical devices and used either directly or with necessary modification on the condition of befitting the particular method of polymerization to be adopted. For example, a polymerization vessel so shaped as to suit the purpose of use of the produced polymer may be utilized for the batch polymerization and such a continuous polymerizing device as a belt conveyor which is provided with a compressing roller may be utilized for the continuous polymerization. Such a polymerizing apparatus is supplemented with a heating means and a controlling means befitting the particular method of polymerization in use such as, for example, a heating means which can heat a given emulsion to the polymerizing temperature and maintain it at this temperature by dint of such an active thermal energy ray as microwave or near infrared ray capable of utilizing radiant energy or such a thermal medium as hot water or hot air, though not exclusively. The surface of the HIPE which has been placed in the polymerization vessel in preparation for batch polymerization and the surface (both the upper and lower sides) of the HIPE which has been cast on such a drive conveying device as a conveyor in preparation for continuous polymerization is preferred to remain in a state not exposed to the ambient air (specifically the oxygen component of the air) between the time the polymerization is started and the time it is completed. For this purpose, it is commendable to seal the HIPE surface with a varying sealing material by way of allaying the action of the oxygen in the air. The material of which the polymerizing apparatus is made does not need to be particularly restricted. As typical examples of the material, metals and alloys thereof such as aluminum, iron, and stainless steel, synthetic resins such as polyethylene, polypropylene, fluorocarbon resins, polyvinyl chloride, and unsaturated polyester resin, and fiber-reinforced resins (FRP) having such synthetic resins reinforced with fibers such as glass fibers or carbon fibers may be cited.

5. After treatment of Porous Polymer Obtained by Polymerization

The porous polymer which is obtained by the polymerizing step mentioned above may assume an arbitrary form based on the shape which has been imparted at the shaping step mentioned above. Specifically, since it generally assumes the same form as is imparted by the shaping during the course of polymerization, it suffices to perform the shaping in a form fit for the purpose of use of the final product. Optionally, the HIPE may be polymerized in the form of a sheet having a thickness of about 50 mm and then after treated in an arbitrary form as by slicing the sheet into sheets or films 5 mm in thickness. Also by the method of continuous polymerization, an HIPE in the form of a sheet or a film may be horizontally conveyed and meanwhile polymerized and then after treated in an arbitrary form. In this case, a method which consists is continuously polymerizing an HIPE in the form of a sheet or a film not more than 50 mm in thickness and then sliding the sheet or the film into sheets each having a thickness of 5 mm may be employed, for example.

(d) Aftertreating (Reduction to Finished Product) Step after Formation of Porous Polymer 1. Dehydration The porous polymer obtained as described above is generally dehydrated by compression, decompressive aspiration, or the combination thereof. Generally the dehydration thus performed removes 50–98% of the water used, with the remainder of the water adhering to the porous polymer. The rate of this dehydration is properly set, depending as on the purpose of use of the porous polymer. Generally, it suffices to set this rate so that the porous polymer in a perfectly dried state may have a water content in the range of 0.5–10 g or in the range of 1–5 g per g. of the polymer.

2. Compression

The porous polymer of this invention, depending on the kind of itself, can be compressed to one of several parts of the original thickness. The form such as of a compressed sheet has a small volume as compared with the original porous polymer and permits a saving in the cost of transportation and storage. The porous polymer in the compressed form, on exposure to a large volume of water, is disposed to absorb water and resume the original thickness. This absorption of water is characterized by the fact that the speed thereof is higher than the speed at which the porous polymer in the original thickness absorbs water.

For the purpose of enabling the porous polymer to assume the compressed form, it suffices to use a compressing means fit for the form of the porous polymer so as to exert uniform pressure on the entire porous polymer and compress it uniformly. Incidentally, the porous polymer in the form of a sheet proves advantageous because it enables the pressure to be easily applied uniformly throughout the entire volume thereof, allows use of any of numerous existing compressing devices, and permits such a device to be operated easily. After the porous polymer in the form of a sheet has been dehydrated, it only needs to pass between rolls or belts opposed to each other across a prescribed interval. Since the sheet generally incurs a slight decrease in thickness in consequence of the application of compression during the dehydrating step or the operation of decompressive aspiration, the elaborate incorporation of the compressing step is not justified when the thickness of the sheet after the dehydrating step falls within the prescribed range. In the case of such a porous polymer in the form of other than a sheet as the porous polymer in a cylindrical form, for example, the impartation of a compressed state to the cylindrical porous polymer may be accomplished by preparing a larger deformable cylinder made of a metal and a smaller concentrically uniformly inflatable cylinder made of a rubber tube, disposing the larger and smaller cylinders respectively outside and inside the cylindrical wall of the porous polymer, and compressing the intervening cylindrical wall of the porous polymer by introducing air into the tube of the inner cylinder. Thus, the necessary compression may be attained by using a proper device which fits the form of the porous polymer. Otherwise, the compression may be fulfilled by wrapping the porous polymer in the cylindrical form around a rotary shaft conforming to the inside diameter of the cylindrical porous polymer, setting a roll fast against the outer side of the cylindrical wall of the porous polymer, and rotating the rotary shaft and the roll as pressed against the opposite surfaces of the cylindrical wall of the porous polymer.

The temperature at which the porous polymer is compressed at the preceding dehydrating and compressing steps is preferred to be higher than the glass transition point of the porous polymer. If this temperature is lower than the glass transition point, the shortage will possibly result in disrupting the porous structure of the polymer or altering the pore diameter of the polymer.

From the viewpoint of saving the space necessary for transportation and storage and ensuring the ease of handling, it is effective to compress the porous polymer to not more than ½, preferably to not more than ¼, of the original thickness thereof.

3. Washing

For the purpose of improving the porous polymer in the surface condition, the porous polymer may be washed with purified water, an aqueous solution containing an arbitrary additive, or solvent.

4. Drying

The porous polymer which has been obtained by the preceding steps, when necessary, may be dried by heating with hot air, infrared rays, or microwaves or may be furnished with an adjusted water content by humidification.

5. Cutting

The porous polymer which has been obtained by the preceding steps, when necessary, may be cut in a form and a size as required by way of working into a finished product fit for the purpose of use.

6. Impregnation

The porous polymer may be impregnated with such additives as a detergent, an aromatizer, a deodorant, or an antibacterial agent so as to be endowed with a relevant functionality.

The second and third aspects of this invention, as already pointed out, have such a principal necessary condition for construction as controlling the temperature of an HIPE at each of the steps lest it should produce a change exceeding 10° C. and continuously subjecting the HIPE to (i) a forming, (ii) a shaping, and (iii) a polymerizing step. Generally, the condition equals a method for continuously producing a porous polymer by continuously forming an HIPE, shaping the HIPE on a drive conveying device, and polymerizing the shaped porous polymer. According to the second and third aspects of this invention, since the operation is continuously carried out consistently, the control of the temperature during each of the component steps of the invention is easily implemented and the porous polymer foam having uniform excellent solid state properties can be obtained in such a very short period of time as has never been predicted. Further, since the series of component steps of the process of production can be continuously carried out, the production proceeds with a very high operational efficiency and proves highly efficient economically and industrially.

[II] Now, the fourth, fifth, and sixth aspects of this invention will be described in detail below.

The fourth aspect of this invention is directed toward a method for the production of a porous polymer by the polymerization of a water-in-oil type high internal phase emulsion obtained from an oil phase containing a polymerizing monomer component and a surfactant and a water phase containing water, which method is characterized by comprising (a) an emulsifying step for forming a water-in-oil type high internal phase emulsion, (b) a forming step for forming the emulsion in the form of a sheet or a film, and (c) a polymerizing step for polymerizing the emulsion and having the component steps of the process mentioned above to proceed invariably at a temperature of not lower than 80° C. and not higher than 110° C.

The fifth aspect of this invention is directed toward a method for the production of a porous polymer by the polymerization of a water-in-oil type high internal phase emulsion obtained from an oil phase containing a polymerizing monomer component and a surfactant and a water phase containing water, which method is characterized by comprising (a) a continuous emulsifying step for continuously forming a water-in-oil type high internal phase emulsion, (b) a continuous forming step for continuously forming the emulsion in the form of a sheet or a film, and (c) a continuous polymerizing step for continuously polymerizing the emulsion
and having the component steps of the process mentioned above to proceed invariably at a temperature of not lower than 80° C. and not higher than 110° C.

The sixth aspect of this invention is directed toward a method for the production of a porous polymer by the polymerization of a water-in-oil type high internal phase emulsion obtained from an oil phase containing a polymerizing monomer component and a surfactant and a water phase containing water, which method is characterized by comprising (a) a continuous emulsifying step for continuously forming a water-in-oil type high internal phase emulsion, (b) a continuous forming step for continuously forming the emulsion in a thickness of not more than 50 mm, and (c) a continuous polymerizing step for continuously polymerizing the emulsion
and having the component steps of the process mentioned above to proceed invariably at a temperature of not lower than 80° C. and not higher than 110° C.

For the fourth, fifth, and sixth aspects of this invention, the fact that (a) the forming step, (b) the shaping step, and (c) the polymerizing step respectively of an HIPE are invariably carried out at temperatures exceeding 80° C. and not exceeding 110° C. forms a principal necessary condition for construction. By fulfilling this necessary condition, it is made possible to eliminate the loss of the fine uniformity of the foam caused by the heat shock which is observed when the HIPE is formed at a temperature lower than 80° C. and cured at a temperature higher than 80° C. or when the HIPE is formed at a temperature higher than 80° C. and this temperature nevertheless is suffered to fall during the shaping step and is subsequently elevated to a level higher than 80° C., at which the HIPE is polymerized. The porous polymer which excels in performance is obtained in a very short period of time with high productivity because the polymerization is carried out at such a high temperature as not lower than 80° C. and not higher than 110° C. In this case, the forming temperature $T_0$, the shaping temperature $T_1$, and the polymerizing temperature $T_2$ respectively of the HIPE are generally not lower than 80° C. and not higher than 110° C. They are preferably in the range of 85°–105° C. and more preferably in the range of 90°–100° C. Again in this case, it is commendable to keep the change of temperature of the water-in-oil type high internal phase emulsion during each of the steps ranging from the formation through the polymerization of the water-in-oil type high internal phase emulsion within 10° C. and preferably within 5° C.

For the fifth and sixth aspects of this invention, too, the fact that the HIPE is continuously (i) formed, (ii) shaped, and (iii) polymerized while the temperature of the HIPE is controlled to a level of not higher than 80° C. and not lower than 110° C. forms a principal necessary condition. In this case again, since the operation is continuously carried out consistently, the control of the temperature of the HIPE at a level of not higher than 80° C. and not lower than 110° C. is easily implemented and the porous polymer form endowed with uniform and excellent solid state properties can be obtained in such a very short period of time as has never been predicted. Further, since the series of component steps of the process of production can be continuously carried out, the production proceeds with a very high operational efficiency and proves highly efficient economically and industrially.

In the fourth, fifth, and sixth aspects of the invention, the other necessary conditions for construction are basically the same as those described above with respect to the first through third aspects of the invention.

[III] The seventh method of production contemplated by this invention will be described in detail below.

The seventh aspect of this invention is directed toward a method for the production of a porous polymer by the polymerization of a water-in-oil type high internal phase emulsion obtained from an oil phase containing a polymerizing monomer component and a surfactant and a water phase containing water, which method is characterized by comprising (a) a continuous emulsifying step for continuously forming a water-in-oil type high internal phase emulsion, (b) a continuous forming step for continuously forming the emulsion in a necessary shape, and (c) a continuous polymerizing step for continuously polymerizing the emulsion and having the component steps of the process mentioned above to proceed invariably at a temperature of not lower than 80° C. and having a polymerization initiator incorporated in the emulsion after the start of (a) the continuous emulsifying step and before the completion of (b) the continuous forming step.

The seventh aspect of this invention purports to have (a) the forming step, (b) the shaping step, and (c) the polymerizing step respectively of an HIPE carried out at temperatures invariably exceeding 80° C. and continuously and effect the addition of a polymerization initiator between (a) the time the continuous emulsifying step mentioned above is started and the time (b) the continuous forming step mentioned above is completed.

As typical examples of the way of adding the polymerization initiator to the HIPE, (i) a method which comprises adding the polymerization initiator to the water phase and/or the oil phase in advance of the formation of the HIPE and mixing them, (ii) a method which consists in adding the polymerization initiator at the same time as the HIPE is formed and mixing them, and (iii) a method which consists in adding the polymerization initiator after the HIPE has been formed may be cited. Where (a) the forming step, (b) the shaping step, and (c) the polymerizing step are carried out continuously at temperatures invariably exceeding 80° C., however, the polymerizing monomer component in process of emulsification possibly begins to polymerize, forms a polymer, and prevents the continuous production from being performed in a stable manner, depending on the kind of polymerizing initiator and the method of addition particularly in the case of (a) the method mentioned above. To avoid this accident, the seventh aspect of this invention adds the polymerization initiator between the time (a) the continuous emulsifying step mentioned above is started and the time the continuous shaping step (b) mentioned above is completed.

In consequence of this timing of the addition, the HIPE at an elevated temperature can be smoothly formed, shaped, and polymerized and the foam endowed with excellent absorption properties can be obtained with exceptionally high productivity. As a way of adding and mixing the polymerization initiator, a method of continuously adding the polymerization initiator to the HIPE via an inlet port disposed at an arbitrary position in the path extending from the site for the formation of the HIPE through the site for the completion of the HIPE shaping step and further continuously mixing them by the use of such a line mixer as a static mixer is advantageously used.

Incidentally, the kind of a polymerization initiator and the quantity thereof to be used herein are the same as those described in the paragraph (4) dealing with a polymerization initiator in the section 1. titled "Raw materials used for HIPE". Further, in the redox initiator system, too, the polymerizing monomer component in process of emulsification does not easily begin to polymerize and the continuous production is carried out in a stable manner so long as the method of addition contemplated by the seventh aspect of this invention is applied to either an oxidizing agent or a reducing agent.

In the seventh aspect of this invention, the other necessary conditions for construction are basically the same as those described above with respect to the first through sixth aspects of the invention.

Now, this invention will be described more specifically below with reference to working examples. In these working examples, the performance of a given porous polymer was determined and evaluated as follows.

<Degree of Water Release and Surface Condition of Porous Polymer>

The fine uniformity of the surface of a produced porous polymer was determined by visually observing a spot of the surface magnified to 50 times the original size with the aid of an SEM and evaluating the result of the observation.

<Compressive Strength>

The monoaxial (direction of thickness) compressive strength of a given sample was determined at 24° C. by the use of a testing device (made by Instron Corp. and sold under registered trademark designation of "Instron 1186-RE5500") and reported as reduced to the international unit system (kPa).

<Preparation of Artificial Urine>

An artificial urine was prepared by dissolving 10 mass parts of KCl, 10 mass parts of $Na_2SO_4$, 4.25 mass parts of $NH_4H_2PO_4$, 0.75 mass part of $(NH_4)_2HPO_4$, 1.25 mass parts of $CaCl_2.2H_2O$, and 2.5 mass parts of $MgCl_2.6H_2O$ in 4971.25 mass parts of deionized water.

<Height of Suction>

A strip 1 cm in width and 80 cm in length was cut from a given porous polymer sample and suspended vertically from one end thereof. The lower leading end of this strip was immersed to a length of about 4 cm in a large quantity of the artificial urine prepared as described and left standing in this state for three days, with the pool of the urine replenished with new supply from time to time to maintain the level constant. At the end of the 3 days' standing, the foam which had absorbed the urine was pulled up till the height of the lowermost part not immersed in the artificial urine thereof decreased to 0 cm. The removed foam was cut into unit heights of 2 cm, which were each weighed ($W_1$).

The unit heights were dried and then each weighed ($W_0$). The capacity for absorption of each of the unit heights was found by calculation ($W_1/W_0$).

The height of the part of the foam equivalent to the capacity of absorption of 90%, based on the capacity of absorption of 100% of the part of the height of 0 cm not immersed in the artificial urine, was determined and reported as the height of absorption (cm).

EXAMPLE 1

An oil phase mixture solution (hereinafter referred to as "oil phase") was prepared by adding together a monomer component composed of 5.1 mass parts (hereinafter referred to briefly as "parts") of 2-ethylhexyl acrylate, 3.1 parts of 42% divinyl benzene (p-ethyl-vinyl benzene as the other moiety), and 1.1 parts of 1,6-hexanediol diacrylate and 0.6 part of glycerol monooleate and 0.1 part of ditallow dimethyl ammonium methyl sulfate as surfactants and uniformly dissolving them. Separately, an aqueous water phase solution (hereinafter referred to as "water phase") was prepared by dissolving 18 parts of calcium chloride in 425 parts of deionized water and heated to 85° C. A water-in-oil type high internal phase emulsion (HIPE) was continuously formed by continuously feeding the oil phase and the water phase at the ratio indicated above into a stirring-mixing device. The ratio of the water phase and the oil phase was 44.3/1 and the forming temperature $T_0$ of the HIPE was 85° C.

The HIPE consequently formed was continuously extracted from the stirring-mixing device, heated preparatorily to 85° C., and supplied to a static mixer provided in the periphery thereof with a heating and an insulating member. A liquid obtained by dissolving 0.5 part of sodium persulfate as a water-soluble polymerization initiator in 6 parts of deionized water was fed to the static mixer via an inlet port so as to mix the HIPE with the polymerization inhibitor continuously. Consequently, the ratio of the water phase and the oil phase eventually changed to 45/1.

The HIPE was conveyed through an insulated and heated flexible tube, cast into a square polymerization vessel of stainless steel measuring 1100 mm in length, 100 mm in width, and 5 mm in wall thickness and kept preparatorily at 85° C. by insulation, and shaped therein. The shaping temperature $T_1$ of the HIPE was 81° C. The polymerization vessel was stoppered on the upper side and then immersed in a water bath adapted to fix the polymerizing temperature $T_2$ of the HIPE at 85° C. The vessel was pulled up from the water bath 15 minutes after the start of heating to obtain a cured wet porous polymer. The quantity of the polymerization inhibitor to be completely decomposed over 15 minutes of the polymerizing time was found to be 0.314 mol %. By dehydrating and compressing this porous polymer, a porous polymer (1) having a water content of about 20% based on the weight of the porous polymer in a dried state was obtained. This porous polymer (1) was visually examined for surface condition with an SEM and tested for compressive strength and height of absorption. The results are shown in Table 1 below.

EXAMPLE 2

The same polymerization initiator-containing HIPE as was obtained in Example 1 (the forming temperature $T_0=85°$ C.) was conveyed through an insulated and heated flexible tube, cast onto a traveling belt heated to 85° C., installed horizontally, and driven at a fixed speed and continuously shaped in the form of a sheet about 50 cm in width and about 5 mm in thickness. The shaping temperature $T_1$ of the HIPE was 82° C. This HIPE was passed through a polymerizing zone having a polymerizing temperature $T_2$ controlled at 85° C. so as to be polymerized continuously and made to form a cured wet porous polymer. The quantity of the polymerization inhibitor to be completely decomposed in 15 minutes of the polymerizing time was found to be 0.314 mol %. By dehydrating and compressing this porous polymer, a porous polymer (2) having a water content of about 20% based on the quantity of the porous polymer in a dried state was obtained. This porous polymer (2) was visually examined for surface condition with an SEM and tested for compressive strength and height of absorption. The results are shown in Table 1 below.

EXAMPLE 3

An oil phase mixture solution (hereinafter referred to as "oil phase") was prepared by adding together a monomer component composed of 4.9 parts of 2-ethylhexyl acrylate, 3.2 parts of 42% divinyl benzene (p-ethyl-vinyl benzene as the other moiety), and 1.2 parts of 1,6-hexanediol diacrylate and 0.6 part of glycerol monooleate and 0.1 part of ditallow dimethyl ammonium methyl sulfate as surfactants and uniformly dissolving them. Separately, an aqueous water phase solution (hereinafter referred to as "water phase") was prepared by dissolving 18 parts of calcium chloride in 425 parts of deionized water and heated to 95° C. A water-in-oil type high internal phase emulsion (HIPE) was continuously formed by continuously feeding the oil phase and the water phase at the ratio indicated above into a stirring-mixing device. The ratio of the water phase and the oil phase was 44.3/1 and the forming temperature $T_0$ of the HIPE was 95° C.

The HIPE consequently formed was continuously extracted from the stirring-mixing device, heated preparatorily to 95° C., and supplied to a static mixer provided in the periphery thereof with a heating and an insulating member. A liquid obtained by dissolving 0.5 part of sodium persulfate as a water-soluble polymerization initiator in 6 parts of deionized water was fed to the static mixer via an inlet port so as to mix the HIPE with the polymerization inhibitor continuously. Consequently, the ratio of the water phase and the oil phase eventually changed to 45/1.

The HIPE was conveyed through an insulated and heated flexible tube, cast into a square polymerization vessel of stainless steel measuring 1100 mm in length, 100 mm in width, and 5 mm in wall thickness and kept preparatorily at 85° C. by insulation, and shaped therein. The shaping temperature $T_1$ of the HIPE was 92° C. The polymerization vessel was stoppered on the upper side and then immersed in a water bath adapted to fix the polymerizing temperature $T_2$ of the HIPE at 95° C. The vessel was pulled up from the water bath 5 minutes after the start of heating to obtain a cured wet porous polymer. The quantity of the polymerization inhibitor to be completely decomposed over 5 minutes of the polymerizing time was found to be 0.295 mol %. By dehydrating and compressing this porous polymer, a porous polymer (3) having a water content of about 20% based on the weight of the porous polymer in a dried state was obtained. This porous polymer (3) was visually examined for surface condition with an SEM and tested for compressive strength and height of absorption. The results are shown in Table 1 below.

EXAMPLE 4

The same polymerization initiator-containing HIPE as was obtained in Example 3 (the forming temperature $T_0=95°$ C.) was conveyed through an insulated and heated flexible tube, cast onto a traveling belt heated to 95° C., installed horizontally, and driven at a fixed speed and continuously shaped in the form of a sheet about 50 cm in width and about 5 mm in thickness. The shaping temperature $T_1$ of the HIPE was 92° C. This HIPE was passed through a polymerizing zone having a polymerizing temperature $T_2$ controlled at 96° C. so as to be polymerized continuously and made to form a cured wet porous polymer. The quantity of the polymerization inhibitor to be completely decomposed in 15 minutes of the polymerizing time was found to be 0.295 mol %. By dehydrating and compressing this porous polymer, a porous polymer (4) having a water content of about 20% based on the quantity of the porous polymer in a dried state was obtained. This porous polymer (4) was visually examined for surface condition with an SEM and tested for compressive strength and height of absorption. The results are shown in Table 1 below.

EXAMPLE 5

An HIPE was formed by following the procedure of Example 3 while using an aqueous water phase solution heated to 85° C. (the forming temperature $T_0=85°$ C). The polymerization initiator-containing HIPE thus obtained was conveyed through an insulated and heated flexible tube, cast onto a traveling belt heated to 95° C., installed horizontally, and driven at a fixed speed and continuously shaped in the form of a sheet about 50 cm in width and about 5 mm in thickness. The shaping temperature $T_1$ of the HIPE was 82° C. This HIPE was passed through a polymerizing zone having a polymerizing temperature $T_2$ controlled at 96° C. so as to be polymerized continuously and made to form a cured wet porous polymer. The quantity of the polymerization inhibitor to be completely decomposed in 7 minutes of the polymerizing time was found to be 0.336 mol %. By dehydrating and compressing this porous polymer, a porous polymer (5) having a water content of about 20% based on the quantity of the porous polymer in a dried state was obtained. This porous polymer (5) was visually examined for surface condition with an SEM and tested for compressive strength and height of absorption. The results are shown in Table 1 below.

EXAMPLE 6

An oil phase mixture solution (hereinafter referred to as "oil phase") was prepared by adding together a monomer component composed of 4.9 parts of 2-ethylhexyl acrylate, 3.2 parts of 42% divinyl benzene (p-ethyl-vinyl benzene as the other moiety), and 1.2 parts of 1,6-hexanediol diacrylate and 0.6 part of glycerol monooleate and 0.1 part of ditallow dimethyl ammonium methyl sulfate as surfactants and uniformly dissolving them. Separately, an aqueous water phase solution (hereinafter referred to as "water phase") was prepared by dissolving 18 parts of calcium chloride in 425 parts of deionized water and heated to 98° C. A water-in-oil type high internal phase emulsion (HIPE) was continuously formed by continuously feeding the oil phase and the water phase at the ratio indicated above into a stirring-mixing device. The ratio of the water phase and the oil phase was 44.3/1 and the forming temperature $T_0$ of the HIPE was 98° C.

The HIPE consequently formed was continuously extracted from the stirring-mixing device, heated preparatorily to 96° C., and supplied to a static mixer provided in the periphery thereof with a heating and an insulating member. A liquid obtained by dissolving 0.5 part of sodium persulfate as a water-soluble polymerization initiator in 5 parts of deionized water was fed to the static mixer via an inlet port so as to mix the HIPE with the polymerization inhibitor continuously. Consequently, the ratio of the water phase and the oil phase eventually changed to 45/1.

The HIPE was conveyed through an insulated and heated flexible tube, cast onto a belt heated to 96° C., installed horizontally, and driven at a fixed speed, and continuously formed into a sheet about 50 cm in width and about 5 mm in thickness. The shaping temperature $T_1$ of the HIPE was 95° C. This HIPE was continuously polymerized by being passed through a polymerizing zone having a polymerizing temperature $T_2$ controlled to 96° C. over a period of about 5 minutes so as to obtain a cured wet porous polymer. The quantity of the polymerization inhibitor to be completely decomposed over 5 minutes of the polymerizing time was found to be 0.323 mol %. By dehydrating and compressing this porous polymer, a porous polymer (6) having a water content of about 20% based on the weight of the porous polymer in a dried state was obtained. This porous polymer (6) was visually examined for surface condition with an SEM and tested for compressive strength and height of absorption. The results are shown in Table 1 below.

EXAMPLE 7

An oil phase mixture solution (hereinafter referred to as "oil phase") was prepared by adding together a monomer component composed of 4.9 parts of 2-ethylhexyl acrylate, 3.2 parts of 42% divinyl benzene (p-ethyl-vinyl benzene as the other moiety), and 1.2 parts of 1,6-hexanediol diacrylate and 0.6 part of glycerol monooleate and 0.1 part of ditallow dimethyl ammonium methyl sulfate as surfactants and uniformly dissolving them. Separately, an aqueous water phase solution (hereinafter referred to as "water phase") was prepared by dissolving 18 parts of calcium chloride in 425 parts of deionized water and heated to 98° C. A water-in-oil type high internal phase emulsion (HIPE) was continuously formed by continuously feeding the oil phase and the water phase at the ratio indicated above into a stirring-mixing device. The ratio of the water phase and the oil phase was 44.3/1 and the forming temperature $T_0$ of the HIPE was 98° C.

The HIPE consequently formed was continuously extracted from the stirring-mixing device, heated preparatorily to 85° C., and supplied to a static mixer provided in the periphery thereof with a heating and an insulating member. A liquid obtained by dissolving 0.8 part of sodium persulfate as a water-soluble polymerization initiator in 7 parts of deionized water was fed to the static mixer via an inlet port so as to mix the HIPE with the polymerization inhibitor continuously. Consequently, the ratio of the water phase and the oil phase eventually changed to 45/1.

The HIPE was conveyed through an insulated and heated flexible tube, cast onto a belt heated to 96° C., installed horizontally, and driven at a fixed speed, and continuously formed into a sheet about 50 cm in width and about 5 mm in thickness. The shaping temperature $T_1$ of the HIPE was 95° C. This HIPE was continuously polymerized by being passed through a polymerizing zone having a polymerizing temperature $T_2$ controlled to 96° C. over a period of about 4.5 minutes so as to obtain a cured wet porous polymer. The quantity of the polymerization inhibitor to be completely decomposed over 4.5 minutes of the polymerizing time was found to be 0.492 mol %. By dehydrating and compressing this porous polymer, a porous polymer (7) having a water content of about 20% based on the weight of the porous polymer in a dried state was obtained. This porous polymer (7) was visually examined for surface condition with an SEM and tested for compressive strength and height of absorption. The results are shown in Table 1 below.

EXAMPLE 8

The same polymerization initiator-containing HIPE as was obtained in Example 7 (the forming temperature $T_0$=98° C.) was conveyed through an insulated and heated flexible tube, cast onto a traveling belt heated to 96° C., installed horizontally, and driven at a fixed speed and continuously shaped in the form of a sheet about 50 cm in width and about 5 mm in thickness. The shaping temperature $T_1$ of the HIPE was 95° C. This HIPE was passed through a polymerizing zone having a polymerizing temperature $T_2$ controlled at 96° C. over a period of about 3.5 minutes so as to be polymerized continuously and made to form a cured wet porous polymer. The quantity of the polymerization inhibitor to be completely decomposed in 3.5 minutes of the polymerizing time was found to be 0.380 mol %. By dehydrating and compressing this porous polymer, a porous polymer (8) having a water content of about 20% based on the quantity of the porous polymer in a dried state was obtained. This porous polymer (8) was visually examined for surface condition with an SEM and tested for compressive strength and height of absorption. The results are shown in Table 1 below.

EXAMPLE 9

An oil phase mixture solution (hereinafter referred to as "oil phase") was prepared by adding together a monomer component composed of 4.9 parts of 2-ethylhexyl acrylate, 3.2 parts of 42% divinyl benzene (p-ethyl-vinyl benzene as the other moiety), and 1.2 parts of 1,6-hexanediol diacrylate and 0.6 part of glycerol monooleate and 0.1 part of ditallow dimethyl ammonium methyl sulfate as surfactants and uniformly dissolving them. Separately, an aqueous water phase solution (hereinafter referred to as "water phase") was prepared by dissolving 18 parts of calcium chloride in 425 parts of deionized water and heated to 98° C. A water-in-oil type high internal phase emulsion (HIPE) was continuously formed by continuously feeding the oil phase and the water phase at the ratio indicated above into a stirring-mixing device. The ratio of the water phase and the oil phase was 44.3/1 and the forming temperature $T_0$ of the HIPE was 98° C.

The HIPE consequently formed was continuously extracted from the stirring-mixing device, heated preparatorily to 96° C., and supplied to a static mixer provided in the periphery thereof with a heating and an insulating member. A liquid obtained by dissolving 1.7 parts of sodium persulfate as a water-soluble polymerization initiator in 3.8 parts of deionized water was fed to the static mixer via an inlet port so as to mix the HIPE with the polymerization inhibitor continuously. Consequently, the ratio of the water phase and the oil phase eventually changed to 45/1.

The HIPE was conveyed through an insulated and heated flexible tube, cast onto a belt heated to 96° C., installed horizontally, and driven at a fixed speed, and continuously formed into a sheet about 50 cm in width and about 5 mm in thickness. The shaping temperature $T_1$ of the HIPE was 95° C. This HIPE was continuously polymerized by being passed through a polymerizing zone having a polymerizing temperature $T_2$ controlled to 96° C. over a period of about 2.5 minutes so as to obtain a cured wet porous polymer. The quantity of the polymerization inhibitor to be completely decomposed over about 2.5 minutes of the polymerizing time was found to be 0.545 mol %. By dehydrating and compressing this porous polymer, a porous polymer (9) having a water content of about 20% based on the weight of the porous polymer in a dried state was obtained. This porous polymer (9) was visually examined for surface condition with an SEM and tested for compressive strength and height of absorption. The results are shown in Table 1 below

EXAMPLE 10

The same polymerization initiator-containing HIPE as was obtained in Example 9 (the forming temperature $T_0$=98° C.) was conveyed through an insulated and heated flexible tube, cast onto a traveling belt heated to 85° C., installed horizontally, and driven at a fixed speed and continuously shaped in the form of a sheet about 50 cm in width and about 5 mm in thickness. The shaping temperature $T_1$ of the HIPE was 96° C. This HIPE was passed through a polymerizing zone having a polymerizing temperature $T_2$ controlled at 96° C. so as to be polymerized continuously and made to form a cured wet porous polymer. The quantity of the polymerization inhibitor to be completely decomposed in 3.5 minutes of the polymerizing time was found to be 0.383 mol %. By dehydrating and compressing this porous polymer, a porous polymer (10) having a water content of about 20% based on the quantity of the porous polymer in a dried state was obtained. This porous polymer was continuously sliced perpendicularly to the direction of thickness with a band knife into two vertically separated sheets each measuring about 50 cm in width and about 1 mm in thickness. The separated sheets were then dried further to obtain porous polymers (upper sheet 10-A and lower sheet 10-B) having a water content of about 20% based on the quantity of the porous polymer in a dried state. The porous polymer (10-A) and porous polymer (10-B) were visually examined for surface condition with an SEM and tested for compressive strength and height of absorption. The results are shown in Table 1 below.

Control 1

An oil phase mixture solution (hereinafter referred to as "oil phase") was prepared by adding together a monomer component composed of 5.1 mass parts (hereinafter referred to briefly as "parts") of 2-ethylhexyl acrylate, 3.1 parts of 42% divinyl benzene (p-ethyl-vinyl benzene as the other moiety), and 1.1 parts of 1,6-hexanediol diacrylate and 0.6 part of glycerol monooleate and 0.1 part of ditallow dimethyl ammonium methyl sulfate as surfactants and uniformly dissolving them. Separately, an aqueous water phase solution (hereinafter referred to as "water phase") was prepared by dissolving 18 parts of calcium chloride in 425 parts of deionized water and heated to 65° C. A water-in-oil type high internal phase emulsion (HIPE) was continuously formed by continuously feeding the oil phase and the water phase at the ratio indicated above into a stirring-mixing device. The ratio of the water phase and the oil phase was 44.3/1 and the forming temperature $T_0$ of the HIPE was 65° C.

The HIPE consequently formed was continuously extracted from the stirring-mixing device and supplied to a static mixer. A liquid obtained by dissolving 0.5 part of sodium persulfate as a water-soluble polymerization initiator in 6 parts of deionized water was fed to the static mixer via an inlet port so as to mix the HIPE with the polymerization inhibitor continuously. Consequently, the ratio of the water phase and the oil phase eventually changed to 45/1.

The HIPE was conveyed through a flexible tube, cast into a square polymerization vessel of stainless steel measuring 1100 mm in length, 100 mm in width, and 5 mm in wall thickness, and shaped therein. The shaping temperature $T_1$ of the HIPE was 57° C. The polymerization vessel was stoppered on the upper side and then immersed in a water bath adapted to fix the polymerizing temperature $T_2$ of the HIPE at 85° C. The vessel was pulled up from the water bath 15 minutes after the start of heating to obtain a cured wet porous polymer. The quantity of the polymerization inhibitor to be completely decomposed over 15 minutes of the polymerizing time was found to be 0.255 mol %. By dehydrating and compressing this porous polymer, a porous polymer (1) for control having a water content of about 20% based on the weight of the porous polymer in a dried state was obtained. This porous polymer (1) for control was visually examined for surface condition with an SEM and tested for compressive strength and height of absorption. The results are shown in Table 1 below.

Control 2

The same polymerization initiator-containing HIPE as was obtained in Control 1 (the forming temperature $T_0$=65° C.) was conveyed through a flexible tube, cast onto a belt installed horizontally and driven at a fixed speed, and continuously shaped thereon in the form of a sheet about 50 cm in width and about 5 mm in thickness. The shaping temperature $T_1$ of the HIPE was 55° C. This HIPE was continuously polymerized by being passed over a period of about 15 minutes through a polymerizing zone having a polymerizing temperature $T_2$ controlled at 85° C. so as to form a cured wet porous polymer. The quantity of the polymerization inhibitor to be completely decomposed in 15 minutes of the polymerizing time was found to be 0.255 mol %. By dehydrating and compressing this porous polymer, a porous polymer (2) for control having a water content of about 20% based on the quantity of the porous polymer in a dried state was obtained. This porous polymer (2) for control was visually examined for surface condition with an SEM and tested for compressive strength and height of absorption. The results are shown in Table 1 below.

Control 3

An HIPE was formed by following the procedure of Control 1 while using an aqueous water phase solution heated to 55° C. (the forming temperature $T_0$=85° C.). This polymerization initiator-containing HIPE was conveyed through a flexible tube, cast onto a belt installed horizontally and driven at a fixed speed, and continuously shaped in the form of a sheet about 50 cm in width and about 5 mm in thickness. The shaping temperature $T_1$ of the HIPE was 50° C. This HIPE was passed over a period of about 7 minutes through a polymerizing zone having a polymerizing temperature $T_2$ controlled at 95° C. so as to be polymerized continuously and made to form a cured wet porous polymer. The quantity of the polymerization inhibitor to be completely decomposed in 7 minutes of the polymerizing time was found to be 0.184 mol %. By dehydrating and compressing this porous polymer, a porous polymer (3) for control having a water content of about 20% based on the quantity of the porous polymer in a dried state was obtained. This porous polymer (3) for control was visually examined for surface condition with an SEM and tested for compressive strength and height of absorption. The results are shown in Table 1 below.

Control 4

An HIPE was formed by following the procedure of Example 3 while using an aqueous water phase solution heated to 85° C. (the forming temperature $T_0$=85° C.). This polymerization initiator-containing HIPE was conveyed through a flexible tube, cast onto a belt installed horizontally and driven at a fixed speed, and continuously shaped in the form of a sheet about 50 cm in width and about 5 mm in thickness. The shaping temperature $T_1$ of the HIPE was 77° C. This HIPE was passed over a period of about 7 minutes through a polymerizing zone having a polymerizing temperature $T_2$ controlled at 95° C. so as to be polymerized continuously and made to form a cured wet porous polymer. The quantity of the polymerization inhibitor to be completely decomposed in 7 minutes of the polymerizing time was found to be 0.336 mol %. By dehydrating and compressing this porous polymer, a porous polymer (4) for control having a water content of about 20% based on the quantity of the porous polymer in a dried state was obtained. This porous polymer (2) was visually examined for surface condition with an SEM and tested for compressive strength and height of absorption. The results are shown in Table 1 below.

TABLE 1

| | | HIPE forming temperature, $T_0$ (° C.) | HIPE shaping temperature, $T_1$ (° C.) | HIPE polymerizing temperature, $T_2$ (° C.) | Polymerizing time (min) | Visual examination of surface condition with SEM | Compressive strength (kPa) | Height of absorption (cm) |
|---|---|---|---|---|---|---|---|---|
| Example 1 | porous polymer (1) | 85 | 81 | 85 | 15 | homogeneous | 9.8 | 58 |
| Example 2 | porous polymer (2) | 85 | 82 | 85 | 15 | homogeneous | 10.2 | 60 |
| Example 3 | porous polymer (3) | 95 | 92 | 95 | 5 | homogeneous | 9.7 | 56 |
| Example 4 | porous polymer (4) | 95 | 92 | 96 | 5 | homogeneous | 9.8 | 57 |
| Example 5 | porous polymer (5) | 85 | 82 | 96 | 7 | homogeneous | 9.9 | 60 |
| Example 6 | porous polymer (6) | 98 | 95 | 96 | 5 | homogeneous | 9.9 | 62 |
| Example 7 | porous polymer (7) | 98 | 95 | 96 | 4.5 | homogeneous | 10.1 | 62 |
| Example 8 | porous polymer (8) | 98 | 95 | 96 | 3.5 | homogeneous | 9.9 | 60 |
| Example 9 | porous polymer (9) | 98 | 95 | 96 | 2.5 | homogeneous | 9.7 | 60 |
| Example 10 | porous polymer (10-A) | 98 | 96 | 96 | 3.5 | homogeneous | 9.8 | 60 |
| | porous polymer (10-B) | 98 | 96 | 96 | 3.5 | homogeneous | 9.7 | 59 |
| Control 1 | porous polymer (1) for control | 65 | 57 | 85 | 15 | many voids | 9.1 | 44 |
| Control 2 | porous polymer (2) for control | 65 | 55 | 85 | 15 | many voids | 9.2 | 48 |
| Control 3 | porous polymer (3) for control | 55 | 50 | 95 | 7 | many voids | 8.7 | 41 |
| Control 4 | porous polymer (4) for control | 85 | 77 | 95 | 7 | there is voids | 9.0 | 53 |

Industrial Applicability

The electro conductive low thermal expansion ceramic originating in this invention, as described in detail above, can give rise to materials for precision machine parts which enjoy such light weight and high dimensional stability as make the parts fit for use in an environment demanding a high degree of cleanliness.

What is claimed is:

1. A method for the production of a porous polymer by the polymerization of a water-in-oil type high internal phase emulsion obtained from an oil phase containing a polymerizable monomer component and a surfactant and a water phase containing water, which method is characterized by comprising (a) an emulsifying step for forming a water-in-oil type high internal phase emulsion, (b) a shaping step for shaping the emulsion in the form of a sheet or a film, and (c) a polymerizing step for polymerizing the emulsion and having the temperatures during the component steps mentioned above so controlled as to produce no change exceeding 10° C.

2. A method for the production of a porous polymer by the polymerization of a water-in-oil type high internal phase emulsion obtained from an oil phase containing a polymerizable monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in the form of a sheet or a film, and (c) a continuous polymerizing step for continuously polymerizing the emulsion and having the temperatures during the component steps mentioned above so controlled as to produce no change exceeding 10° C.

3. A method for the production of a porous polymer by the polymerization of a water-in-oil type high internal phase emulsion obtained from an oil phase containing a polymerizable monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in a thickness of not more than 50 mm, and (c) a continuous polymerizing step for continuously polymerizing the emulsion and having the temperatures during the component steps mentioned above so controlled as to produce no change exceeding 10° C.

4. A method for the production of a porous polymer by the polymerization of a water-in-oil type high internal phase emulsion obtained from an oil phase containing a polymerizable monomer component and a surfactant and a water phase containing water, which method is characterized by comprising (a) an emulsifying step for forming a water-in-oil type high internal phase emulsion, (b) a shaping step for shaping the emulsion in the form of a sheet or a film, and (c) a polymerizing step for polymerizing the emulsion and having the component steps of the process mentioned above to proceed invariably at a temperature of not lower than 80° C. and not higher than 110° C.

5. A method for the production of a porous polymer by the polymerization of a water-in-oil type high internal phase emulsion obtained from an oil phase containing a polymerizable monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in the form of a sheet or a film, and (c) a continuous polymerizing step for continuously polymerizing the emulsion and having the component steps of the process mentioned above to proceed invariably at a temperature of not lower than 80° C. and not higher than 110° C.

6. A method for the production of a porous polymer by the polymerization of a water-in-oil type high internal phase emulsion obtained from an oil phase containing a polymerizable monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in a thickness of not more than 50 mm, and (c) a continuous polymerizing step for continuously polymerizing the emulsion and having the component steps of the process mentioned above to proceed invariably at a temperature of not lower than 80° C. and not higher than 110° C.

7. A method for the production of a porous polymer by the polymerization of a water-in-oil type high internal phase emulsion obtained from an oil phase containing a polymerizable monomer component and a surfactant and a water phase containing water, which method is characterized by comprising (a) a continuous emulsifying step for continuously forming a water-in-oil type high internal phase emulsion, (b) a continuous shaping step for continuously shaping the emulsion in a necessary shape, and (c) a continuous polymerizing step for continuously polymerizing the emulsion and having the component steps of the process mentioned above to proceed invariably at a temperature of not lower than 80° C. and having a polymerization initiator incorporated in the emulsion after the start of (a) the continous emulsifying step and before the completion of (b) the continuous shaping step.

* * * * *